US012766884B2

(12) United States Patent
Albl et al.

(10) Patent No.: US 12,766,884 B2
(45) Date of Patent: Oct. 20, 2026

(54) WHEEL BEARING ARRANGEMENT AND METHOD FOR MOUNTING SUCH A WHEEL BEARING ARRANGEMENT

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 333 days.

(21) Appl. No.: 18/615,287

(22) Filed: Mar. 25, 2024

(65) Prior Publication Data

US 2024/0408913 A1 Dec. 12, 2024

(30) Foreign Application Priority Data

Jun. 7, 2023 (DE) ......................... 102023114988.1

(51) Int. Cl.
*B60B 27/06* (2006.01)
*F16D 1/108* (2006.01)

(52) U.S. Cl.
CPC ............ *B60B 27/065* (2013.01); *F16D 1/108* (2013.01)

(58) Field of Classification Search
CPC ......... B60B 27/02; B60B 27/065; B60B 3/14; B60B 3/147; B60B 9/00; F16D 1/108
USPC ............................................ 301/133, 35.627
See application file for complete search history.

(56) References Cited

U.S. PATENT DOCUMENTS 8,025,578 B2 9/2011 Cermak
2006/0244303 A1* 11/2006 Savarese ................ B60B 27/00 301/105.1
2009/0230759 A1* 9/2009 Cermak .............. B60B 27/0005 301/110.6
2013/0322804 A1* 12/2013 Von Schleinitz ..... F16C 33/586 29/898.07

FOREIGN PATENT DOCUMENTS

| | | | | | | |
|---|---|---|---|---|---|---|
| DE | 19543436 | C2 | * | 10/2000 | ......... B60B 27/0005 |
| DE | 102007057047 | A1 | | 5/2009 | |
| DE | 102009051930 | A1 | * | 7/2010 | ............. F16C 43/04 |
| DE | 102013205340 | B3 | | 7/2014 | |
| DE | 10326617 | B4 | | 7/2016 | |
| DE | 102018103219 | A1 | | 8/2019 | |
| DE | 102019128622 | A1 | * | 4/2021 | ......... B60B 27/0031 |
| DE | 102022101120 | B3 | * | 3/2023 | ........... B60B 35/121 |
| EP | 1508710 | B1 | * | 3/2007 | .............. F16D 1/09 |
| FR | 3096098 | A1 | | 11/2020 | |
| JP | 2007332509 | A | * | 12/2007 | |
| JP | 2008230372 | A | * | 10/2008 | |

(Continued)

OTHER PUBLICATIONS

DE102019128622A1_espacedotnetEnglishTranslation (Year: 2021).*

(Continued)

*Primary Examiner* — S. Joseph Morano
*Assistant Examiner* — Eva L Comino
(74) *Attorney, Agent, or Firm* — Maier & Maier, PLLC

(57) ABSTRACT

A wheel bearing arrangement, preferably for a motor vehicle, with a cardan shaft, a wheel hub, a screw with a screw head, and a pretensioning element. The wheel hub is connected to the cardan shaft by the screw. The pretensioning element is arranged and/or braced between the screw head, preferably a head underside of the screw head, and the wheel hub.

16 Claims, 6 Drawing Sheets

(56) References Cited

FOREIGN PATENT DOCUMENTS

| | | | | | |
|---|---|---|---|---|---|
| WO | WO-2008128515 | A1 | * | 10/2008 | ............. F16D 3/223 |
| WO | 2015046361 | A1 | | 4/2015 | |

OTHER PUBLICATIONS

Extended Search Report issued on Sep. 10, 2024, in corresponding European Application No. 24163551.5, 16 pages.

Search Report issued on Feb. 8, 2024, in corresponding German Application No. 102023114988.1, 8 pages.

* cited by examiner

WHEEL BEARING ARRANGEMENT AND METHOD FOR MOUNTING SUCH A WHEEL BEARING ARRANGEMENT

FIELD

The invention relates to a wheel bearing arrangement and to a method for mounting such a wheel bearing arrangement.

BACKGROUND

A generic wheel bearing arrangement for a motor vehicle has a cardan shaft, a wheel hub and a screw with a screw head. In addition, a coil spring as a pretensioning device and an O-ring as an entrainment means are provided as mounting parts for the screw. The wheel hub is connected to the cardan shaft in a torque-transmitting manner by means of the screw. The wheel hub is braced between the screw head and the cardan shaft. The coil spring is arranged between a shaft of the screw and the wheel hub, whereby the shaft provides a contact surface for the coil spring and is therefore geometrically redesigned accordingly.

A disadvantage of the wheel bearing arrangement is that the screw with the mounting parts is complex to manufacture. A further disadvantage is that the screw is not optimally designed in terms of weight due to the provision of the contact surface for the coil spring.

DE 10 2007 057 047 A1 discloses a method for assembling a wheel hub component with a shaft joint component connected thereto in a rotationally fixed manner via a spur toothing and a corresponding connecting arrangement. A screw is supported on one of the aforementioned components via a spring element, the possible spring travel of which between a tooth-open position and a tooth-closed position of the spur toothing is not significantly less than the height of the teeth of the spur toothing.

A mounting aid for a wheel bearing unit is known from DE 10 2013 205 340 B3, in which the wheel bearing hub or the joint bell is assigned an elastic expanding sleeve as a mounting aid, which interacts with the associated further component. The design and the installation position of the expanding sleeve mean that the expanding sleeve only locks via a snap or click connection when an end position is reached in which the spur toothing of the wheel bearing hub and the bell joint are in a tooth-in-gap position, thereby springing open locally and releasing a central passage opening of the clamping screw into the bell joint.

DE 10 2018 103 219 A1 discloses a wheel flange with a rotational axle for a driven wheel of a motor vehicle. The wheel flange has at least one connecting element for connecting a wheel, wherein the connecting element has a spur toothing and a central bore, a joint housing with a mating spur toothing corresponding to the spur toothing of the connecting element and with a central thread receptacle, a central screw with a screw head, wherein the central screw is arranged in the central bore of the connecting element and is screwed into the threaded receptacle of the joint housing, and an elastomer element which is arranged between the screw head of the central screw and the connecting element and, in a tooth-on-tooth position of the spur toothing, can be compressed with the mating spur toothing along an axial spring path in such a way that the elastomer element applies an axial spring force.

A wheel bearing unit for a vehicle is known from DE 10 2019 128 622 A1. The wheel bearing unit comprises a shaft, a wheel hub, a central screw and a spring element, wherein the wheel hub and the shaft are arranged coaxially to one another and each have an end spur toothing for a rotationally rigid connection, wherein the shaft has a central threaded bore into which the central screw is screwed for tensioning the wheel hub with the shaft, wherein the spring element is pot-shaped, comprises a first and second flange portion as well as a ring portion arranged therebetween and connecting them to one another, wherein the ring portion is at least partially supported radially on the wheel hub, wherein the first flange portion is at least partially radially outwardly formed and is axially supported on the wheel hub and/or on the central screw, and wherein the second flange portion is at least partially radially inwardly and elastically resiliently formed and is axially supported on the central screw.

SUMMARY

The object of the invention is to provide a wheel bearing arrangement which can be produced with low manufacturing effort and low manufacturing costs. A further object of the invention is to provide a method with which a wheel bearing arrangement can be mounted cost-effectively and reliably.

According to the invention, a wheel bearing arrangement, preferably for a motor vehicle, is proposed, namely with a cardan shaft, a wheel hub, a screw with a screw head and a pretensioning element, wherein, preferably in a final mounted state of the wheel bearing arrangement, the wheel hub is connected to the cardan shaft by means of the screw, preferably in a torque-transmitting manner. According to the invention, the pretensioning element is arranged and/or clamped between the screw head, preferably a head underside of the screw head, and the wheel hub. By using the pretensioning element, additional mounting parts associated with the screw can be omitted. This has the advantage that the wheel bearing arrangement has a lower weight compared to known wheel bearing arrangements. Furthermore, mounting of the wheel bearing arrangement is simple and can be carried out with little logistical effort due to the elimination of additional mounting parts. In addition, this wheel bearing arrangement does not require any cost-intensive corrosion protection coating, as the wheel and/or brake disc centering in this wheel bearing arrangement is not provided by the wheel hub, but by the pretensioning element.

Preferably, it can be provided that the cardan shaft is formed by a drive shaft which is suitable and/or designed to transmit a drive torque from a drive unit of a vehicle to the wheel hub.

As an example, it may be provided that the pretensioning element is a separate and/or integral and/or material-uniform component and/or separate from the wheel hub. Since the wheel hub is generally a forged component, in which complex geometries can only be realized at great expense, the wheel hub can be manufactured with less complexity and the pretensioning element can be freely designed according to the respective requirements. This saves costs and manufacturing effort, as the forged wheel hub does not have to be modified, or at least not significantly.

As an example, it may be provided that the pretensioning element has a spring portion, a base portion, a cone portion, a sleeve portion and a fold portion. Preferably, it can be provided that the spring portion merges, preferably directly, into the base portion. Alternatively or additionally, it may be provided that the base portion merges, preferably directly, into the cone portion. Alternatively or additionally, it may be provided that the cone portion merges, preferably directly, into the sleeve portion. Alternatively or additionally, it may be provided that the sleeve portion merges, preferably directly, into the fold portion.

Preferably, it can be provided that the pretensioning element, preferably the spring portion, lies directly on the underside of the head of the screw. This has the advantage that a commercially available standard screw can be used, which does not require any subsequent changes to its geometry in order to achieve a good mechanical connection to the pretensioning element. Alternatively or additionally, it may be provided that the pretensioning element, preferably the base portion and/or the spring portion, rests directly on the wheel hub, preferably on a centering contour of the wheel hub.

In a preferred embodiment, it may be provided that the pretensioning element has a, preferably resilient, spring portion which is arranged and/or braced between the screw head, preferably an underside of the screw head, and the wheel hub. Alternatively or additionally, it may be provided that the cardan shaft has a cardan shaft spur toothing that meshes with a wheel hub spur toothing of the wheel hub. The fact that only part of the pretensioning element, i.e., the spring portion, acts as a spring means that other parts of the pretensioning element can be designed for other purposes, such as wheel centering for a vehicle wheel. This means that the pretensioning element not only fulfils one function, e.g., a spring function, but also other functions, such as a wheel centering function. The number of individual components required to implement the wheel bearing arrangement is therefore reduced.

In a particularly preferred embodiment, it may be provided that the pretensioning element, preferably a spring portion of the pretensioning element, is supported on the wheel hub, preferably on a centering contour of the wheel hub, and, preferably during mounting and/or assembly of the wheel bearing arrangement, exerts an axial force on the screw head, preferably on a head underside of the screw head and/or directly on a head underside of the screw head. Preferably, it can be provided that the pretensioning element exerts the axial force, preferably in relation to a longitudinal screw axis of the screw, against a screw-in direction of the screw, i.e., preferably in a positive longitudinal screw axis direction. Due to the axial force, it is possible that once the spur toothing of the cardan shaft and the wheel hub have been brought into meshing engagement, they are pressed against each other during assembly and/or mounting of the wheel bearing arrangement and thus also held in meshing engagement during assembly and/or mounting.

In an exemplary embodiment, it may be provided that the pretensioning element has a sleeve portion and that the sleeve portion, preferably an outer circumferential surface of the sleeve portion, forms a wheel centering surface for a vehicle wheel, preferably for a rim of a vehicle wheel, and/or a brake disc. As already mentioned above, the pretensioning element fulfills a dual function, whereby a first function is that the screw is subjected to the axial force during assembly of the wheel bearing arrangement. A second function of the dual function is that the pretensioning element provides the wheel centering for a vehicle wheel of a motor vehicle.

Preferably, it can therefore be provided that it is not the wheel hub but the pretensioning element, preferably the outer circumferential surface of the sleeve portion, that provides and/or forms the wheel centering and/or the wheel centering surface. In the event of a model change, for example, necessary adjustments to the wheel centering therefore only affect the pretensioning element and not the wheel hub itself. Complex modifications to the geometry of the forged wheel hub are therefore not necessary.

In an exemplary embodiment, it may be provided that the spring portion is formed by spring tabs which are distributed in the circumferential direction around a pretensioning element passage, preferably assigned to the pretensioning element, and are spaced apart from one another with slot-shaped recesses arranged in between. Depending on the number of recesses and, for example, the width of the spring tabs, a desired spring behavior can be set in a structurally simple and cost-effective manner.

In a preferred embodiment, it can be provided that the pretensioning element has a base portion and a cone portion, and that the base portion and/or the cone portion and/or the sleeve portion are in contact with the wheel hub, preferably a centering contour of the wheel hub. The centering contour has the advantage that the pretensioning element is centered relative to the wheel hub via the centering contour.

Preferably, it can be provided that the base portion has the shape of a perforated disk. Alternatively or additionally, it can be provided that the pretensioning element tapers in the area of the cone portion starting from the sleeve portion and up to the base portion, preferably inwards towards the rim. Self-centering of the pretensioning element relative to the wheel hub is advantageously achieved via the cone portion.

As an example, it may be provided that the base portion, preferably together with the spring portion, forms a screw head contact surface for the screw head of the screw, preferably in the final mounted state of the wheel bearing arrangement.

It is particularly preferable that the pretensioning element has a fold portion into which the sleeve portion merges directly and/or in material connection and/or in one piece, and that the pretensioning element has a parallel open sheet metal fold in the fold portion, preferably radially inwards. The fold portion increases the mechanical stability of the pretensioning element and increases it in comparison to a straight pretensioning element.

In an exemplary embodiment, it may be provided that the wheel bearing arrangement has an entrainment means and/or that the wheel bearing arrangement is assigned an entrainment means, whereby it may preferably be provided that the entrainment means increases a thread friction between an external thread of the screw and an internal thread of the cardan shaft, at least in portions, with respect to an external thread of the screw and/or with respect to the longitudinal axis of the screw. The entrainment means ensures that the spur toothing of the cardan shaft and the wheel hub, provided that they are in tooth-to-tooth engagement with each other during mounting, i.e., when screwing in the screw, are slightly rotated against each other so that the spur toothing engage with each other. In this way, a correct connection of the wheel hub and the cardan shaft is achieved via the respective spur toothing, even if accessibility and/or visibility of the spur toothing is poor.

Preferably, the entrainment means can be arranged, preferably on the screw, in such a way that the increased thread friction only occurs once the screw has been screwed in so far, that tooth tips of the teeth of the cardan shaft spur toothing lie in a common plane with tooth tips of the teeth of the wheel hub spur toothing and/or insofar as the screw is screwed in to such an extent that tooth tips of the teeth of the cardan shaft spur toothing project into tooth gaps of the wheel hub spur toothing. The special arrangement position of the entrainment means ensures that the cardan shaft only rotates with the screw when the cardan shaft spur toothing can be supported on the wheel hub spur toothing. This ensures that the screw continues to turn into the internal thread of the cardan shaft as the screw turns.

In a particularly preferred embodiment, it may be provided that the entrainment means is formed by a coating, preferably by a screw locking lacquer, which is applied to the screw, preferably to an external thread of the screw, and/or that the entrainment means is formed in that a diameter of the external thread, preferably a core, external and/or pitch diameter of the external thread, is larger than a diameter of the internal thread, preferably a core, external and/or pitch diameter of the internal thread, and/or in that the entrainment means is formed in that a thread pitch of an external thread of the screw deviates by a pitch deviation from a thread pitch of the internal thread of the cardan shaft. The variants listed for the design of the entrainment means represent particularly cost-effective options in which the wheel bearing arrangement can be realized with as few individual components as possible.

Also proposed according to the invention is a vehicle, preferably a passenger car, with a wheel bearing arrangement as described above.

Also proposed according to the invention is a method for mounting a wheel bearing arrangement as described above, with a provision step in which the cardan shaft, the wheel hub, the pretensioning element and the screw are provided and in which the screw is guided with its shaft through the pretensioning element passage and through the wheel hub passage to form a preassembly unit, and a preassembly step, in which the preassembled assembly and the cardan shaft are guided towards each other and the screw is partially screwed into the internal thread of the cardan shaft, preferably without torque transmission, and a final mounting step, in which the screw is screwed further into the internal thread and tightened with a predefined tightening torque. According to the invention, the pretensioning element is arranged and/or clamped between the screw head, preferably the underside of the head of the screw head, and the wheel hub.

BRIEF DESCRIPTION OF THE FIGURES

Examples of embodiments of the invention are explained in more detail below with reference to the attached schematic drawing.

In particular.

DETAILED DESCRIPTION

Figure 1:
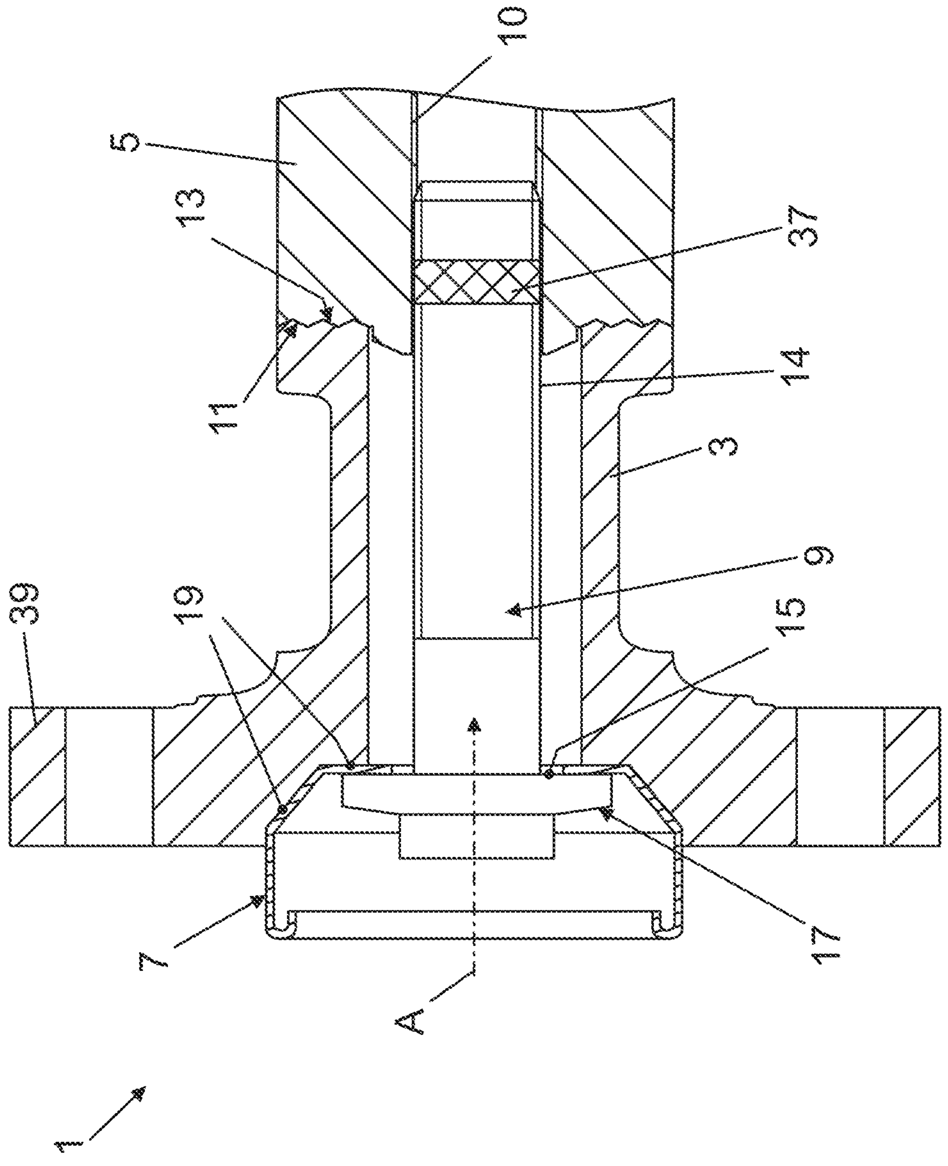
FIG. 1 shows a longitudinal sectional view of a wheel bearing arrangement in the final mounted state with a pretensioning element.

FIG. 1 shows a wheel bearing arrangement 1 for a motor vehicle (not shown), preferably for a passenger car, in a final mounted state. The wheel bearing arrangement 1 has a, preferably forged, wheel hub 3, a cardan shaft 5, a pretensioning element 7 and a screw 9 with a longitudinal screw axis A. The positive longitudinal screw axis direction is marked with an arrowhead in FIG. 1. The positive longitudinal screw axis direction corresponds to the screw-in direction of the screw 9.

The wheel hub 3 has a wheel hub spur toothing 11 on the cardan shaft side and the cardan shaft 5 has a cardan shaft spur toothing 13 on the wheel hub side. The wheel hub spur toothing 11 and the cardan shaft spur toothing 13 correspond to each other and are in meshing engagement with each other in the final mounted state of the wheel bearing arrangement 1. In the final mounted state of the wheel bearing arrangement 1, the wheel hub 3 and the cardan shaft 5 are positively connected to each other via the wheel hub spur toothing 11 and the cardan shaft spur toothing 13.

The screw 9 has an external thread 14, with which the screw 9 is screwed into an internal thread 10 of the cardan shaft 5 in the final mounted state of the wheel bearing arrangement 1 and turned tight and/or tightened with a predefined tightening torque. In the final mounted state of the wheel bearing arrangement 1, the wheel hub 3 is non-positively connected and/or braced to the cardan shaft 5 by means of the screw 9. In the final mounted state, there is both a non-positive and a positive connection between the wheel hub 3 and the cardan shaft 5, so that even large torques can be transmitted from the cardan shaft 5 to the wheel hub 3 and vice versa. In other words, the connection between the cardan shaft 5 and the wheel hub 3 is made up of at least two types of connection, namely on the one hand by the positive connection via the spur toothing 11 and 13 and on the other hand—with the wheel hub 3 and the pretensioning element 7 in between-via the force-fit connection between the screw 9 and the cardan shaft 5.

The pretensioning element 7 is interposed between an underside 15 of a screw head 17 of the screw 9 and a centering contour 19 of the wheel hub 3. The pretensioning element 7 lies radially on the outside of the centering contour 19, so that the pretensioning element 7 is centered relative to the wheel hub 3 in the final mounted state of the wheel bearing arrangement 1 and is arranged concentrically to it.

In the illustrated embodiment, the pretensioning element 7 is made of a thin deep-drawn sheet of stainless spring steel, merely as an example. At this point, it should be explicitly pointed out that the pretensioning element 7 can alternatively also be made of other materials, such as plastic. It also does not necessarily have to be a metal sheet made of stainless steel and/or spring steel.

Figure 5:
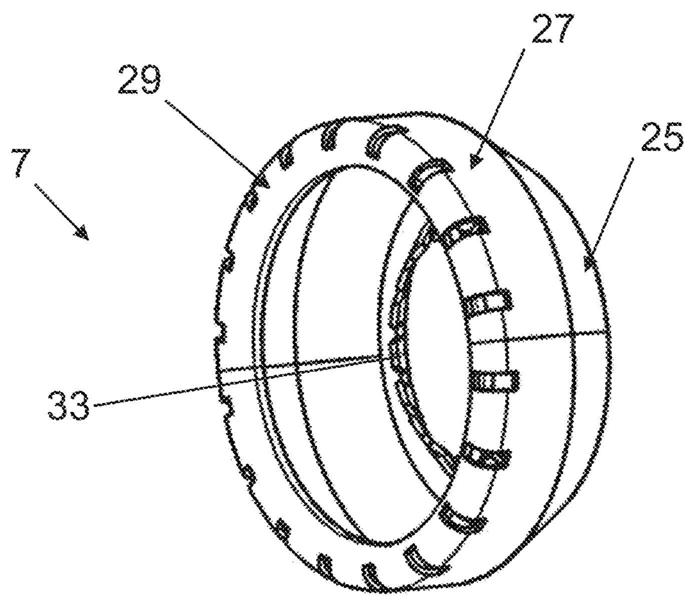
FIG. 5 shows in a perspective view the pretensioning element alone.
Figure 6:
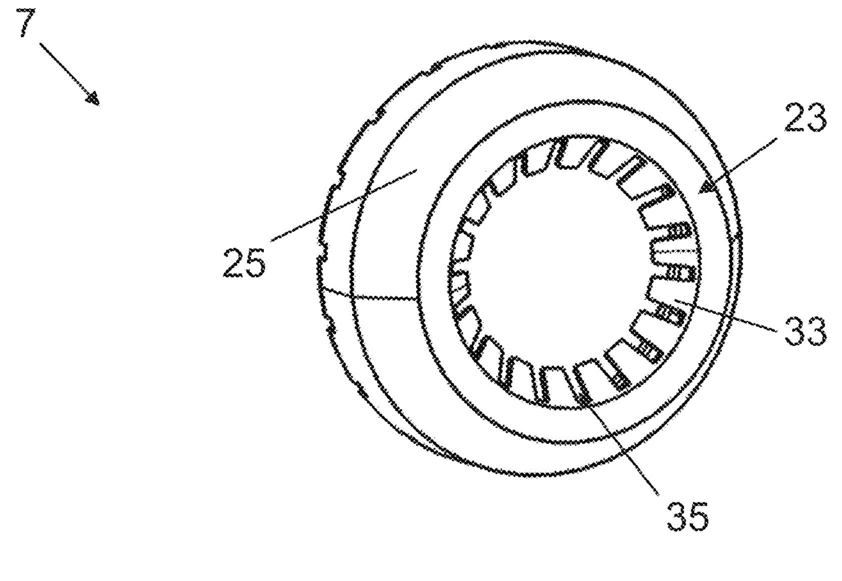
FIG. 6 shows in another perspective view the pretensioning element alone.
Figure 7:
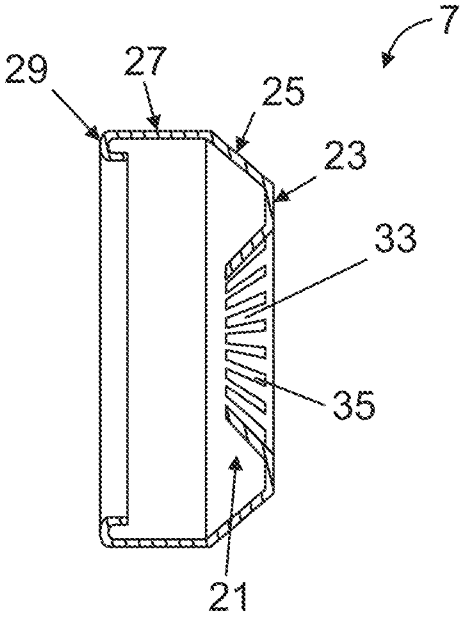
FIG. 7 shows a longitudinal sectional view of the pretensioning element alone.

As shown in FIGS. 5 to 7, the pretensioning element 7 is formed by a composite body that is formed in one piece and of one material. The body has a resilient spring portion 21, a base portion 23, a substantially cone-shaped cone portion 25, a sleeve portion 27 and a fold portion 29. The sleeve portion 27 has the shape of a straight and circular hollow cylinder. The sleeve portion 27 is thin-walled and radially outwards defines a receiving space for the screw head 17.

An outer circumferential surface of the sleeve portion 27 forms a centering surface on which a wheel rim (not shown) of a vehicle wheel can be pushed onto and/or centered with respect to the wheel hub, preferably with a positive fit and/or a precise fit. The wheel rim is centered and/or concentrically aligned to the wheel hub via the centering surface. In the wheel mounting arrangement 1 shown, the wheel and/or rim is therefore not centered via the wheel hub 3 itself, but by means of a separate component, namely the pretensioning element 7, specifically by means of the outer circumferential surface of the sleeve portion 27 of the pretensioning element 7.

On its side facing away from the wheel hub 3, the sleeve portion 27 merges directly into the fold portion 29. In the fold portion 29, the deep-drawn sheet is folded radially inwards and in the direction of the wheel hub 3, forming a sheet fold, specifically a parallel open sheet fold. The sheet metal wrap contributes to the mechanical stability of the pretensioning element 7. Preferably slot-shaped recesses can be provided in the area of the sleeve portion 27 and/or the fold portion 29, through which water can run off, which can collect radially on the inside of the sleeve portion 27 and/or the fold portion 29. The recesses are shown in FIGS. 5 to 7.

The sleeve portion 27 merges directly into the cone portion 25 on the wheel hub side. In the cone portion 25, the pretensioning element 7 tapers, starting from the sleeve portion 27 and in the direction of the wheel hub 3 up to the base portion 23, into which base portion 23 the cone portion 25 merges directly. On the outer circumference, the cone portion 25 is in direct contact with the centering contour 19 of the wheel hub 3, by way of example only.

The base portion 23 has the shape of a perforated disk, which delimits a circular passage arranged centrally to the perforated disk in a radially outward direction. The base portion 23 is, preferably directly, in contact with the centering contour 19 of the wheel hub 3. The base portion 23 merges directly into the spring portion 21. In the embodiment shown, the spring portion 21 is formed by several spring tabs 33, as shown in FIGS. 5 to 7, merely as an example. The spring tabs 33 each extend from the base portion 23 with their free end radially inwards, i.e., in the direction of the passage, and additionally in the direction of the underside of the head 15. The spring tabs 33 are spaced apart from one another by slot-shaped recesses 35, as shown in FIGS. 5 to 7.

The spring tabs 33 delimit a pretensioning element passage associated with the pretensioning element 7 radially outwards and lie directly against the underside of the head 15. In the final mounted state of the wheel bearing arrangement 1, the spring plates 33 are braced under mechanical pretensioning between the base portion 23 and the underside of the head 15. The spring tabs 33 are supported via the base portion 23 on the centering contour 19 of the wheel hub 3 and exert an axial force on the underside of the head 15, preferably in relation to the longitudinal screw axis A, during assembly and/or installation of the wheel bearing arrangement, against the positive longitudinal screw axis direction and thus against the screw-in direction of the screw 9. The axial force also acts on the cardan shaft 5 in such a way that the cardan shaft 5 is pressed against the wheel hub 3 under the effect of the axial force when the screw 9 is partially or fully screwed in. This means that once the spur toothing 11 and 13 have been brought into meshing engagement during mounting, the spur toothing 11 and 13 are pressed against each other under the effect of the axial force and held in meshing engagement.

The spring tabs 33 are very mildly attached to the base portion 23. Thus, when screwing in and/or tightening the screw 9, it can be achieved that only or almost exclusively only the spring tabs 33 deform elastically, with the other portions of the pretensioning element 7 remaining undeformed. In particular, the sleeve portion 27 should neither change its position nor its orientation when the screw 9 is screwed in and/or tightened. This behavior is also favored in particular by the provision of the slot-shaped recesses 35. Of course, in addition or as an alternative to the slot-shaped recesses 35, a material jump and/or a cross-sectional jump can also be provided in order to achieve the described isolated deformation of the spring tabs 33.

The wheel bearing arrangement 1 has an entrainment means which, in the embodiment shown, is associated with the screw 9, only by way of example. The entrainment means is formed by a screw locking lacquer 37, only by way of example, which is applied to the external thread 14 of the screw 9. The thread friction between the external thread 14 and the internal thread 10 is increased by the entrainment means, specifically by the screw locking lacquer 37. As a result, a frictional force builds up between the external thread 14 and the internal thread 10 when the screw 9 is screwed in and the internal thread 10 comes into contact with the screw locking lacquer 37, which causes the cardan shaft 5 to rotate together with the screw 9 from this point onwards. The entrainment means is arranged on the external thread 14 in such a way that the cardan shaft 5 only rotates with the screw 9 when the tooth tips of the cardan shaft spur toothing lie in a common plane with the tooth tips of the wheel hub spur toothing and/or when the tooth tips of the cardan shaft spur toothing project at least partially into the tooth gaps of the wheel hub spur toothing.

The cardan shaft 5 thus rotates with the screw 9 under the simultaneous effect of the axial force until the cardan shaft spur toothing 13 engages with the wheel hub spur toothing 11. As described above, the axial force then holds the cardan shaft spur toothing 13 in meshing engagement with the wheel hub spur toothing 11.

After the cardan shaft spur toothing 13 has meshed with the wheel hub spur toothing 11, the frictional force is overcome when the screw 9 is screwed in further and the screw 9 is tightened with the predefined tightening torque in the internal thread 10 without the cardan shaft 5 rotating with the screw 9. Once established, the meshing between the cardan shaft spur toothing 13 and the wheel hub spur toothing 11 thus remains reliable throughout the entire assembly process of the wheel bearing arrangement 1.

As an alternative to the screw locking lacquer 37, any other measure can also be used and form the entrainment means which builds up such a high frictional force between the external thread 14 of the screw 9 and the internal thread 10 of the cardan shaft 5 that the cardan shaft 5 rotates together with the screw 9 until the spur toothing 11 and 13 are in meshing engagement for the first time and/or come into meshing engagement for the first time. For example, an outer diameter of the external thread 14 can be slightly larger than an inner diameter of the internal thread. For example, the external thread 14 and the internal thread 10 can also form a correspondingly dimensioned fit and/or mating fit. For example, the external thread 14 and the internal thread 10 can also have different thread pitches. This means that the thread pitch of the external thread 14 deviates from the thread pitch of the internal thread 10 by a pitch deviation of, for example, 0.01 mm. The screw locking lacquer 37 thus represents only one of many examples, in particular examples of a coating, in order to enable and/or promote the build-up of a correspondingly high frictional force between the external thread 14 and the internal thread 10 when screwing in the screw 9. To put it another way: the entrainment means, however it is specifically designed, is such that the screw 9 can only be screwed into the internal thread 10 of the cardan shaft 5 with difficulty in some portions—i.e., with high thread friction.

The entrainment means, specifically the screw locking lacquer 37, are spaced at least far enough away from a screw tip of the screw 9 in the negative longitudinal axis direction of the screw so that the high frictional force only builds up as soon as there is contact between the end spur toothing 11 and 13. This prevents the cardan shaft 5 from rotating out together with the screw 9 beyond the nearest tooth-on-gap position when it is turned in.

The wheel hub 3 has a wheel flange 39 to which the vehicle wheel (not shown) is attached. In addition, the wheel hub 3 is assigned a wheel hub passage, which is limited radially outwards by the wheel hub 3 and through which the screw 9 extends.

A method for mounting the wheel bearing arrangement 1 is described in detail below with reference to FIGS. 1 to 4.

Figure 3:
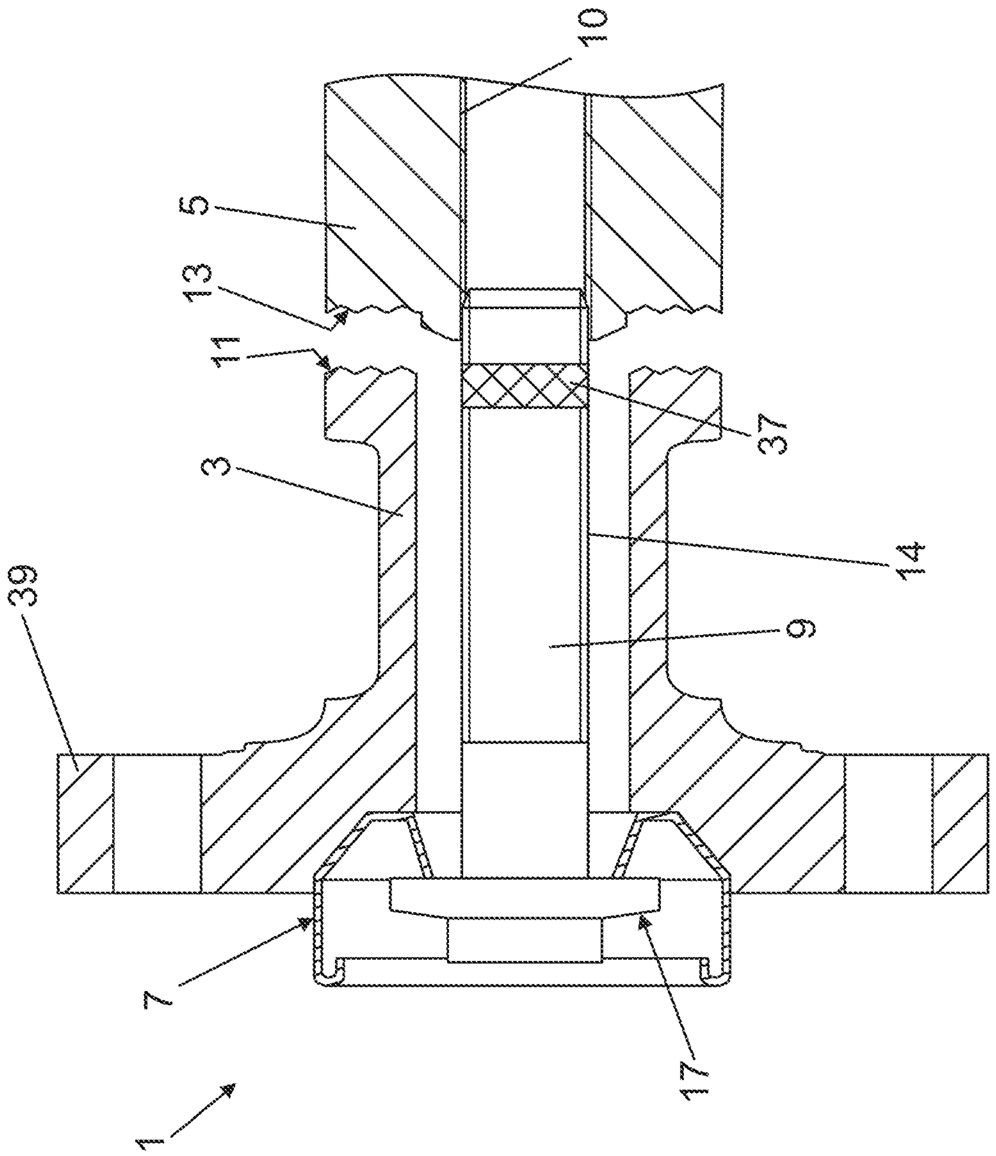
FIG. 3 shows a longitudinal sectional view of process steps for mounting the wheel bearing arrangement as shown in FIG. 1.
Figure 4:
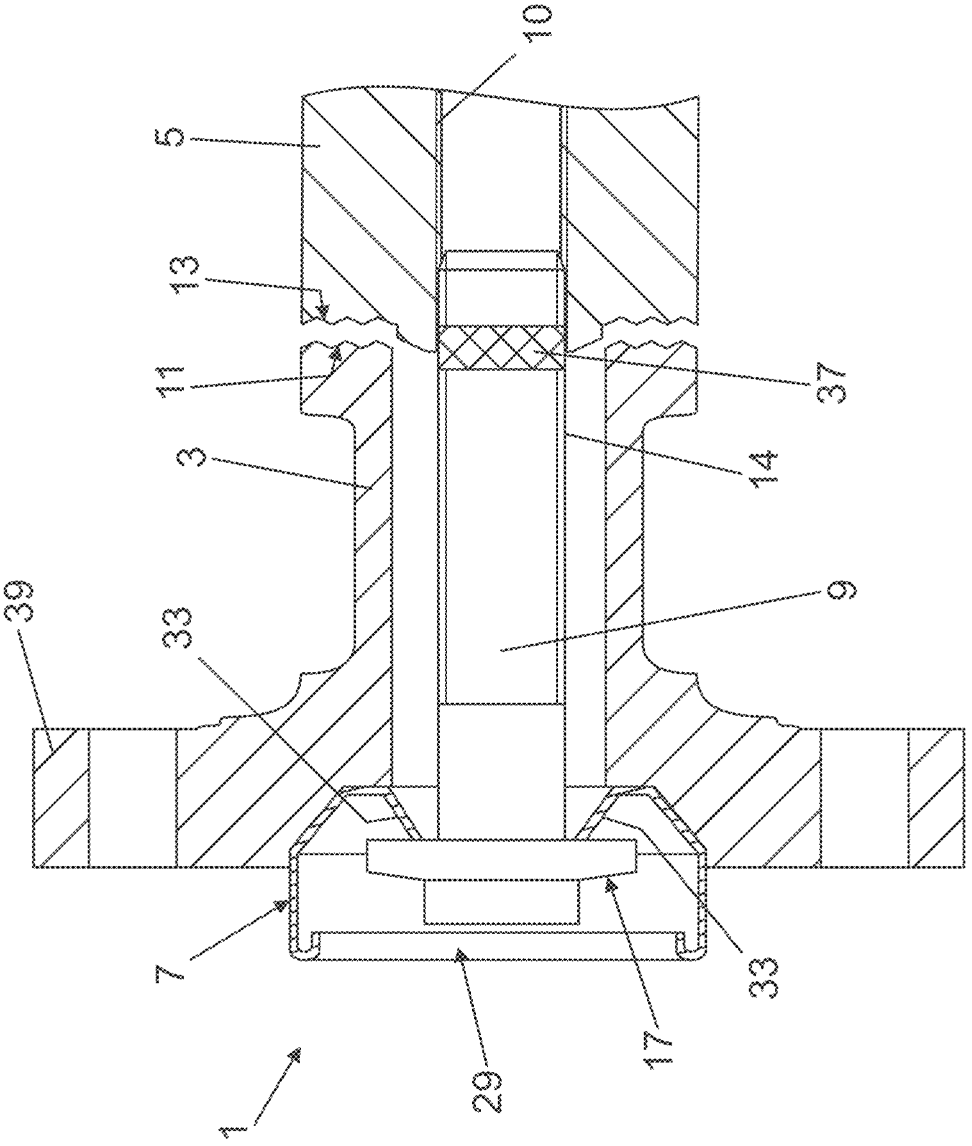
FIG. 4 shows a longitudinal sectional view of process steps for mounting the wheel bearing arrangement as shown in FIG. 1.

The method has a preparation step (see FIG. 2), a pre-assembly step (FIG. 3) and a final mounting step (see FIG. 4). The preparation step is carried out before the pre-assembly step. The pre-assembly step is carried out before the final mounting step.

Figure 2:
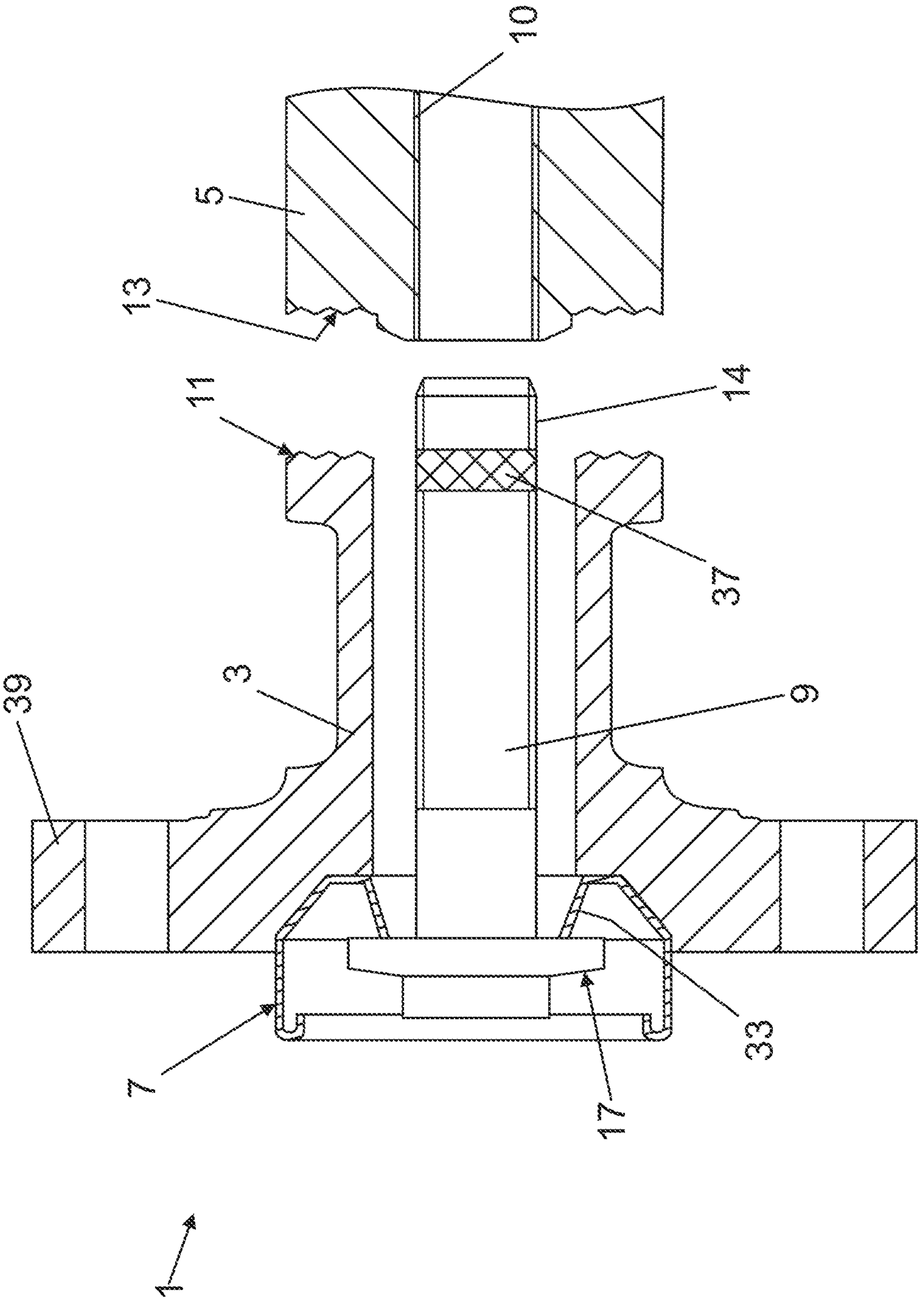
FIG. 2 shows a longitudinal sectional view of process steps for mounting the wheel bearing arrangement as shown in FIG. 1.

In the preparation step, the cardan shaft 5, the wheel hub 3, the pretensioning element 7 and the screw 9 are prepared. In addition, the screw 9 is guided with its shaft through the pretensioning element passage and through the wheel hub passage, as shown in FIG. 2. The spring tabs 33 are mechanically relaxed and initially lie force-free against the underside of the head 15. The base portion 23 and the cone portion 25 of the pretensioning element 7 are initially in force-free contact with the centering contour 19. The external thread 14 of the screw 9 is still out of threaded engagement with the internal thread 10 of the cardan shaft 5. The spur toothing 11 and 13 are not yet in contact. The screw 9, the pretensioning element 7 and the wheel hub 3 form a preassembled assembly after completion of the preparation step.

The pre-assembly step is then carried out, as shown in FIG. 3. In the pre-assembly step, the preassembled assembly and the cardan shaft 5 are guided towards each other and the screw 9 is screwed into the internal thread 10 of the cardan shaft 5 until the external thread 14 of the screw 9 and the internal thread 10 of the cardan shaft 5 are in at least slight threaded engagement. After completion of the pre-assembly step, the spur toothing 11 and 13 are still out of meshing engagement. The screw locking lacquer 37 is still outside the internal thread 10 of the cardan shaft 5 and the spring tabs 33 are still in force-free contact with the underside of the head 15.

After completion of the pre-assembly step, the final mounting step is carried out, as illustrated in FIG. 4. In the final mounting step, the screw 9 is first screwed further into the internal thread 10 of the steering shaft 5. As the screw 9 is further screwed into the internal thread 10 of the cardan shaft 5, the axial distance between the underside of the head 15 and the cardan shaft 5 is shortened in relation to and/or parallel to the longitudinal axis of the screw A. As a result of the shortening of the axial distance, the spur toothing 11 and 13 come into contact when the screw 9 is screwed in. The contact can be formed by the spur toothing 11 and 13 touching each other in a tooth-on-tooth position or being in a tooth-on-gap position.

If the spur toothing 11 and 13 touch in a tooth-on-tooth position, the axial distance between the underside of the head 15 and the cardan shaft 5 is further reduced, whereby the spring tabs 33 between the underside of the head 15 on the one hand and the base portion 23 and/or the centering contour 19 on the other hand are elastically prestressed, building up the axial force. This axial force also acts on the face toothing 11 and 13 and presses them against each other in the tooth-on-tooth position.

If the screw locking lacquer 37 now reaches the internal thread 10 during further screwing in and is screwed into it, a high frictional force builds up, preferably abruptly, between the screw 9 and the internal thread 10 of the cardan shaft 5. Due to the high frictional force, the cardan shaft 5 is rotated together with the screw 9 as the screw 9 is screwed in further. Since the axial force also acts on the underside of the head 15, the cardan shaft 5 rotates together with the screw 9 from the tooth-on-tooth position to the nearest and/or adjacent tooth-on-gap position. This causes the teeth of the cardan shaft spur toothing 13 to slip into the tooth gaps of the wheel hub spur toothing 11, with only a slight and intermediate reduction in the axial force. If the screw 9 is then screwed in further, the teeth of the cardan shaft spur toothing 13 are supported in the circumferential direction on tooth flanks of the teeth of the wheel hub spur toothing 11, so that the screw 9 can continue to be screwed in even under the effect of the high frictional force without the spur toothing 11 and 13 leaving the tooth-on-gap position and/or the cardan shaft 5 continuing to rotate with the screw 9. When the screw 9 is further screwed in under the effect of the high frictional force, the axial force increases again and the tooth-on-gap position is also maintained when the screw 9 is further screwed in, namely until the screw 9 is screwed into the internal thread 10 with the predefined tightening torque and the final mounted state of the wheel bearing arrangement 1 is reached. In the final mounted state of the wheel bearing arrangement 9, the underside of the head 15 lies flat on the base portion 23.

It is of course also conceivable that the spur toothing 11 and 13 do not happen to be in the tooth-on-tooth position at any time during the final mounting step. In this case, the teeth of the cardan shaft spur toothing 13 are immediately supported in the circumferential direction on the tooth flanks of the teeth of the wheel hub spur toothing 11 when the screw 9 is screwed in and the screw 9 can be screwed in under the effect of the high frictional force without the spur toothing 11 and 13 leaving the tooth-on-tooth position. Furthermore, in this case there is no temporary, slight reduction in the axial force and the screw 9 can be screwed into the internal thread 10 with the predefined tightening torque and the final mounted state of the wheel bearing arrangement 1 (see FIG. 1) can be achieved.

LIST OF REFERENCE NUMERALS

1 wheel bearing arrangement
3 wheel hub
5 cardan shaft
7 pretensioning element
9 screw
10 internal thread
11 wheel hub spur toothing
13 cardan shaft spur toothing
14 external thread
15 underside of head
17 screw head
19 centering contour
21 spring portion
23 base portion
25 cone portion
27 sleeve portion
29 fold portion
33 spring tab
35 recess
37 screw locking lacquer
39 wheel flange
A longitudinal screw axis

The invention claimed is:

1. A wheel bearing arrangement, preferably for a motor vehicle, comprising:
- a cardan shaft,
- a wheel hub,
- a screw with a screw head, and
- a pretensioning element,
- wherein the wheel hub is connected to the cardan shaft by the screw,
- wherein the pretensioning element is arranged and/or braced between the screw head, at an underside of the screw head, and the wheel hub, and
- wherein the pretensioning element has a sleeve portion, and the sleeve portion forms a wheel centering surface for a vehicle wheel, for a rim of a vehicle wheel, and/or for a brake disc.

2. The wheel bearing arrangement according to claim 1, wherein:
- the pretensioning element has a resilient spring portion which is arranged and/or braced between the screw head the underside of the screw head, and the wheel hub, and/or
- the cardan shaft has a cardan shaft spur toothing which is in meshing engagement with a wheel hub spur toothing of the wheel hub.

3. The wheel bearing arrangement according to claim 2, wherein:
- the pretensioning element is supported on the wheel hub, and exerts an axial force on the underside of the screw head, during assembly and/or mounting of the wheel bearing arrangement, and
- the pretensioning element exerts the axial force, in relation to a longitudinal screw axis of the screw, against a screw-in direction of the screw.

4. The wheel bearing arrangement according to claim 2, wherein the spring portion is formed by spring tabs, which are arranged distributed in the circumferential direction around a pretensioning element passage and are spaced apart from one another with interposition of slot-shaped recesses.

5. The wheel bearing arrangement according to claim 2, wherein the pretensioning element has a base portion and a cone portion, and the base portion and/or the cone portion and/or the sleeve portion are in abutment connection with the wheel hub, preferably with a centering contour of the wheel hub.

6. The wheel bearing arrangement according to claim 1, wherein:
- the pretensioning element is supported on the wheel hub, and exerts an axial force on the underside of the screw head, during assembly and/or mounting of the wheel bearing arrangement, and
- the pretensioning element exerts the axial force, in relation to a longitudinal screw axis of the screw, against a screw-in direction of the screw.

7. The wheel bearing arrangement according to claim 6, wherein the spring portion is formed by spring tabs, which are arranged distributed in the circumferential direction around a pretensioning element passage and are spaced apart from one another with interposition of slot-shaped recesses.

8. The wheel bearing arrangement according to claim 6, wherein the pretensioning element has a base portion and a cone portion, and the base portion and/or the cone portion and/or the sleeve portion are in abutment connection with the wheel hub, preferably with a centering contour of the wheel hub.

9. The wheel bearing arrangement according to claim 1, wherein the spring portion is formed by spring tabs, which are arranged distributed in the circumferential direction around a pretensioning element passage and are spaced apart from one another with interposition of slot-shaped recesses.

10. The wheel bearing arrangement according to claim 9, wherein the pretensioning element has a base portion and a cone portion, and the base portion and/or the cone portion and/or the sleeve portion are in abutment connection with the wheel hub, preferably with a centering contour of the wheel hub.

11. The wheel bearing arrangement according to claim 1, wherein:
- the pretensioning element has a base portion and a cone portion, and
- the base portion and/or the cone portion and/or the sleeve portion are in abutment connection with the wheel hub.

12. The wheel bearing arrangement according to claim 1, wherein:
- the wheel bearing arrangement has an entrainment means and/or an entrainment means is assigned to the wheel bearing arrangement, and
- the entrainment means causes a thread friction between an external thread of the screw and an internal thread of the cardan shaft to increase with respect to an external thread of the screw, at least in portions.

13. The wheel bearing arrangement according to claim 12, wherein:
- the entrainment means is formed by a coating, which is applied to the screw,
- and/or
- the entrainment means is formed such that a diameter of the external thread is larger than a diameter of the internal thread, and/or
- the entrainment means is formed such that a thread pitch of an external thread of the screw deviates by a pitch deviation from a thread pitch of the internal thread of the cardan shaft.

14. A vehicle with the wheel bearing arrangement according to claim 1.

15. A method for mounting a wheel bearing arrangement according to claim 1, comprising:
- a preparation step, in which the cardan shaft, the wheel hub, the pretensioning element and the screw are provided,
- a pre-assembly step, in which the wheel hub and the cardan shaft are guided towards each other and/or brought closer together, and in which the screw is partially screwed into the internal thread of the cardan shaft, and
- a final mounting step in which the screw is screwed further into the internal thread and tightened with a predefined tightening torque,
- wherein the pretensioning element is arranged and/or braced between the screw head, preferably a head underside of the screw head, and the wheel hub.

16. A wheel bearing arrangement, preferably for a motor vehicle, comprising:
- a cardan shaft,
- a wheel hub,
- a screw with a screw head, and
- a pretensioning element,
- wherein the wheel hub is connected to the cardan shaft by the screw,
- wherein the pretensioning element is arranged and/or braced between the screw head, at an underside of the screw head, and the wheel hub, and
- wherein the pretensioning element has a sleeve portion, a base portion, and a cone portion, and wherein the base portion, the cone portion, and the sleeve portion are in abutment connection with the wheel hub.

* * * * *